US012772006B2

(12) United States Patent
Buszka

(10) Patent No.: US 12,772,006 B2
(45) Date of Patent: Oct. 20, 2026

(54) LOUDSPEAKER TRANSDUCER WITH DISTRIBUTED COIL

(71) Applicant: ALPS ALPINE CO., LTD., Tokyo (JP)

(72) Inventor: Rory Buszka, Novi, MI (US)

(73) Assignee: Alps Alpine Co., Ltd., Tokyo (JP)

( * ) Notice: Subject to any disclaimer, the term of this patent is extended or adjusted under 35 U.S.C. 154(b) by 157 days.

(21) Appl. No.: 18/917,617

(22) Filed: Oct. 16, 2024

(65) Prior Publication Data

US 2026/0107092 A1 Apr. 16, 2026

(51) Int. Cl.
*H04R 9/06* (2006.01)
*H04R 9/02* (2006.01)
*H04R 9/04* (2006.01)

(52) U.S. Cl.
CPC ............. *H04R 9/025* (2013.01); *H04R 9/045* (2013.01); *H04R 9/046* (2013.01); *H04R 9/06* (2013.01)

(58) Field of Classification Search
CPC ........ H04R 9/025; H04R 9/045; H04R 9/406; H04R 9/06
USPC .................................................. 381/412, 398
See application file for complete search history.

(56) References Cited

U.S. PATENT DOCUMENTS 3,983,337 A 9/1976 Babb
5,119,431 A 6/1992 Hamby
5,748,760 A 5/1998 Button
5,909,499 A 6/1999 Tanabe
6,829,366 B2 12/2004 Tanabe
6,996,247 B2 * 2/2006 Stiles ..................... H04R 9/025 381/412
7,065,225 B2 6/2006 Stiles
7,164,777 B1 1/2007 Stompler
8,009,857 B2 8/2011 Bohlender et al.
9,774,957 B2 * 9/2017 Zhang ...................... H04R 9/04
10,681,466 B2 6/2020 Danovi
2003/0133587 A1 7/2003 Hyre et al.
2004/0086150 A1 * 5/2004 Stiles ..................... H04R 9/025 381/419
2004/0156527 A1 * 8/2004 Stiles ..................... H04R 9/063 381/412
2006/0249499 A1 * 11/2006 Winkler ................ F24H 3/0482 219/202

(Continued)

FOREIGN PATENT DOCUMENTS

JP H01288196 A 11/1989
JP H09163495 A 6/1997

(Continued)

*Primary Examiner* — William J Deane, Jr.
(74) *Attorney, Agent, or Firm* — Knobbe, Martens, Olson & Bear, LLP

(57) ABSTRACT

A transducer assembly configured to provide a substantially constant electromagnetic force factor when driving distally and proximally to a top surface. The transducer assembly can include two coil portions and two magnetic gaps separated by a region of greater reluctance. As one of the coil portions moves out of the magnetic gaps while driving in an axial direction, the other coil portion can move into the magnetic gaps to provide a substantially constant speaker force factor. The other coil portion can continue to move from its rest position, through its proximal magnetic gap, and into the distal magnetic gap to provide extended useful linear stroke by using both magnetic gaps in a sequential manner.

20 Claims, 10 Drawing Sheets

(56) References Cited

U.S. PATENT DOCUMENTS

| | | | | |
|---|---|---|---|---|
| 2007/0237353 | A1* | 10/2007 | Stiles | H04R 9/06 381/418 |
| 2009/0028371 | A1* | 1/2009 | Bailey | H04R 9/025 381/386 |
| 2015/0271605 | A1* | 9/2015 | Zhang | H04R 9/025 381/401 |
| 2015/0365769 | A1* | 12/2015 | Yoon | H04R 9/06 381/412 |
| 2025/0016497 | A1 | 1/2025 | Machida | |

FOREIGN PATENT DOCUMENTS

| | | | |
|---|---|---|---|
| JP | 2004 260662 | A | 9/2004 |
| WO | WO 2025/142605 | A1 | 7/2025 |

* cited by examiner

LOUDSPEAKER TRANSDUCER WITH DISTRIBUTED COIL

FIELD

The present disclosure relates in some aspects to transducers, including loudspeaker transducers with a distributed coil.

BACKGROUND

Speaker force factor, which can be denoted by BL, is a parameter that indicates the strength of a loudspeaker motor. The speaker force factor is the product of the magnetic flux density (B) in Telsa and the length (L) in meters of the voice coil within the magnetic gap of the loudspeaker motor. As a voice coil moves in or out of the magnetic gap, the speaker force factor can vary. The calculated speaker force factor can be a surrogate for describing the available motive force induced by the voice coil at a position with the voice coil carrying one Ampere of electrical current.

SUMMARY

Disclosed herein are transducer assemblies (e.g., loudspeaker motors, voice coil motors) with two or more coil portions (e.g., coils, coil bodies, winding bodies) and two or more magnetic gaps (e.g., air gaps). The coil portions and magnetic gaps of the transducer assemblies can be configured such that the speaker force factor is substantially consistent over a long excursion without large offset moving mass, which can be desirable for compact, high performing low-frequency loudspeakers and/or other applications.

The two or more coil portions can have current flow in the same direction. The two or more coil portions can be axially spaced apart from each other along a former disposed around a pole piece. The two or more magnetic gaps can have magnetic flux in the same direction with a region of greater reluctance between adjacent magnetic gaps. As a first coil portion moves out of a first magnetic gap, a second coil portion can move into a second magnetic gap, which can provide a stable (e.g., substantially consistent) BL product. The second coil portion can continue to move through the region of greater reluctance and into the first magnetic gap to provide a stable BL product with the first coil portion outside of the first magnetic gap when the transducer assembly is driving in a first direction. Similarly, the first coil portion can continue to move through the region of greater reluctance and into the second magnetic gap to provide a stable BL product with the second coil portion outside of the second magnetic gap when the transducer assembly is driving in a second direction. Accordingly, the transducer assemblies disclosed herein can provide substantially the same BL product with the transducer assembly driving in first and second directions.

Various transducer assemblies are disclosed herein. The transducer assembly can include a pole piece. The transducer assembly can include a former disposed about the pole piece. The transducer assembly can include a first coil portion and/or a second coil portion disposed on the former. The first coil portion and second coil portion can be axially spaced apart from each other. The first coil portion and the second coil portion can experience current flow in a same direction with respect to a cross-section. The transducer assembly can include a magnetic structure disposed around the pole piece. The magnetic structure can include a magnet (such as a permanent magnet or electromagnet), a first plate, and/or a second plate. The first plate can provide a first magnetic gap having an axial gap length. The second plate can provide a second magnetic gap having the same axial gap length. The first plate and the second plate cooperate to provide a region of greater magnetic reluctance between the first magnetic gap and the second magnetic gap compared to magnetic reluctances at the first magnetic gap and the second magnetic gap. Each of the first coil portion and the second coil portion can include an axial coil length that is approximately equivalent to a combined axial length of the region of greater magnetic reluctance and the axial gap length of the first magnetic gap or the second magnetic gap. The first coil portion can occupy about half of the axial gap length of the first magnetic gap. The second coil portion can occupy about half of the axial gap length of the second magnetic gap with the transducer assembly at rest. The transducer assembly can include a substantially consistent speaker force factor through a majority of a stroke.

In some variants, the second plate can be disposed between the first plate and the magnet in an axial direction.

In some variants, a radial distance between the pole piece and the first plate and the second plate at the first magnetic gap and the second magnetic gap can be smaller than at the region of greater magnetic reluctance.

In some variants, at least one of the first plate and the second plate can include a recess in a radial direction at the region of greater magnetic reluctance.

In some variants, the recess is a notch.

In some variants, the first coil portion and the second coil portion can be wound in a same coil direction about a mandrel.

In some variants, the first magnetic gap can be radially disposed between the pole piece and a portion of the first plate closest to the pole piece.

In some variants, the second magnetic gap can be radially disposed between the pole piece and a portion of the second plate closest to the pole piece.

In some variants, a transducer assembly is disclosed herein. The transducer assembly can include a pole piece. The transducer assembly can include a former disposed about the pole piece. The transducer assembly can include a first coil portion and a second coil portion disposed on the former. The first coil portion and the second coil portion can be axially spaced apart from each other. The first coil portion and the second coil portion can be wound in a same direction with respect to a cross-section. The transducer assembly can include a magnetic structure disposed around the pole piece. The magnetic structure can include a magnet, a first plate that provides a first magnetic gap having a first axial gap length, a second plate that provides a second magnetic gap having a second axial gap length, and/or a region of greater magnetic reluctance compared to magnetic reluctances at the first magnetic gap and the second magnetic gap. The region of greater magnetic reluctance can be disposed between the first magnetic gap and the second magnetic gap. With the transducer assembly at rest, the first coil portion can occupy about half of the first axial gap length of the first magnetic gap and the second coil portion can occupy about half of the second axial gap length of the second magnetic gap.

In some variants, a portion of the first plate is disposed radially outward of the second plate.

In some variants, a radial distance between the pole piece and the first plate at the first magnetic gap can be smaller than at the region of greater magnetic reluctance.

In some variants, the first plate can include a recess in a radial direction at the region of greater magnetic reluctance.

In some variants, the first magnetic gap can be radially disposed between the pole piece and a portion of the first plate closest to the pole piece.

In some variants, the second magnetic gap can be radially disposed between the pole piece and a portion of the second plate closest to the pole piece.

In some variants, a transducer assembly is disclosed herein. The transducer assembly can include a central ferromagnetic component. The transducer assembly can include a tubular member having a closed shape disposed about the central ferromagnetic component. The transducer assembly can include a first conductive coil portion and a second conductive coil portion disposed on the tubular member. The first conductive coil portion and the second conductive coil portion can be axially spaced apart from each other. The first conductive coil portion and the second coil portion can be wound in a same direction. The transducer assembly can include a magnetic structure disposed around the central ferromagnetic component. The magnetic structure can include a magnet, a first ferromagnetic element that provides a first magnetic gap having a first axial gap length, a second ferromagnetic element that provides a second magnetic gap having a second axial gap length, and/or a region of greater magnetic reluctance compared to magnetic reluctances at the first magnetic gap and the second magnetic gap. The region of greater magnetic reluctance can be disposed between the first magnetic gap and the second magnetic gap.

In some variants, a radial distance between the central ferromagnetic component and the first ferromagnetic element at the first magnetic gap can be smaller than at the region of greater magnetic reluctance.

In some variants, the first ferromagnetic element can include a recess in a radial direction at the region of greater magnetic reluctance.

In some variants, the first conductive coil portion can include an axial coil length that is about a combined axial length of the first axial gap length and the region of greater magnetic reluctance.

In some variants, the first magnetic gap can be radially disposed between the central ferromagnetic component and a portion of the first ferromagnetic element closest to the central ferromagnetic component. The second magnetic gap can be radially disposed between the central ferromagnetic component and a portion of the second ferromagnetic element closest to the central ferromagnetic component.

In some variants, the tubular member can be free to move over a distance in response to an electrical signal applied to the first conductive coil portion and the second conductive coil portion.

BRIEF DESCRIPTION OF THE DRAWINGS

These drawings are illustrative embodiments and do not present all possible embodiments of this invention. The illustrated embodiments are intended to illustrate, but not to limit, the scope of protection. Various features of the different disclosed embodiments can be combined to form further embodiments, which are part of this disclosure.

DETAILED DESCRIPTION OF THE PREFERRED EMBODIMENT

Figure 1B:
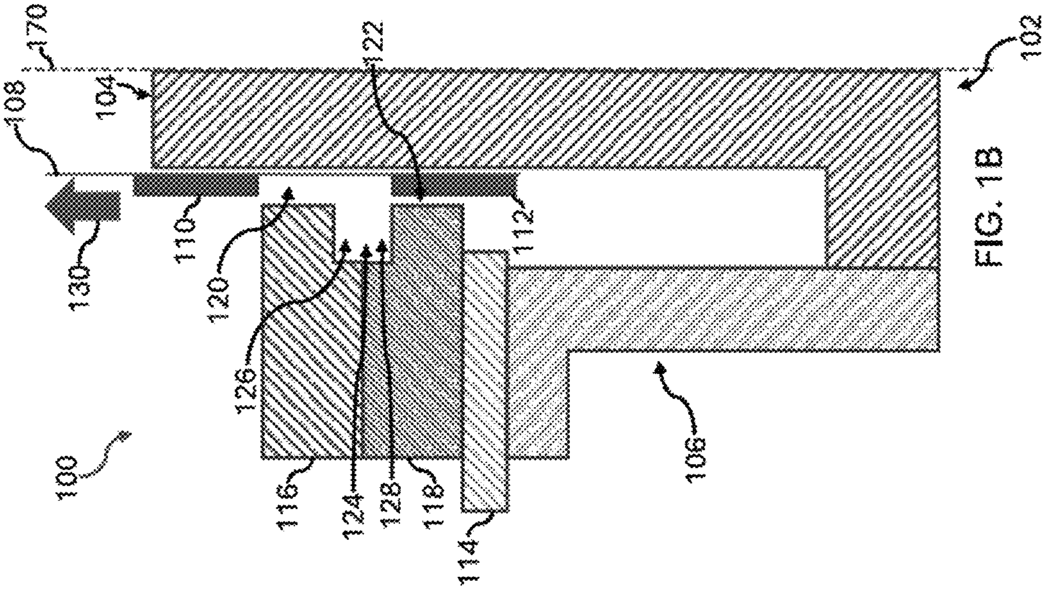
FIG. 1B illustrates the transducer assembly of FIG. 1A driving in a first direction from the configuration illustrated in FIG. 1A with the first coil portion disposed substantially entirely out of the first magnetic gap and the second coil portion disposed along about an entirety of the axial length of the second magnetic gap.

FIG. 1 illustrates a transducer assembly 100, which can also be referred to as a loudspeaker motor, motor assembly, and/or voice coil motor. The transducer assembly 100 can be incorporated into a loudspeaker arrangement in a variety of applications, which can at least include a vehicle (e.g., interior trim of a vehicle) or a structure.

The transducer assembly 100 can include a yoke 102, which can also be referred to as a ferromagnetic yoke. The yoke 102 can include a pole piece 104 (e.g., central ferromagnetic component) and/or a peripheral portion 106. The peripheral portion 106 can be disposed radially outward of the pole piece 104 relative to an axis 170 of the transducer assembly 100 and/or include an annular shape. The pole piece 104 can be an elongate member. The pole piece 104 can include a cross section with a periphery of various shapes, which can at least include circular, obround, oval, polygonal (e.g., square, rectangle, etc.), and/or irregular. The yoke 102 and components thereof can be made of a variety of materials, which can at least include ferromagnetic materials (e.g., steel, iron, etc.).

The transducer assembly 100 can include a former 108, which can also be referred to as a coil former, tubular member, bobbin, and/or coil bobbin. The former 108 can be disposed on or about the pole piece 104. The former 108 can include a shape that corresponds to that of the pole piece 104. The former 108 can be rigid. The former 108 can include a closed shape and be disposed about the pole piece 104.

The transducer assembly 100 can include a first coil portion 110 and/or second coil portion 112, which can be referred to as coils, conductive coil portions, voice coils, coil bodies, and/or winding bodies. The first coil portion 110 and/or second coil portion 112 can be disposed on the former 108. The first coil portion 110 and second coil portion 112 can be wound in a same direction. The first coil portion 110 and second coil portion 112 can be electrically in series. The first coil portion 110 and second coil portion 112 can conduct current flow in a same direction. The first coil portion 110 and second coil portion 112 can be revolved around the axis 170. The first coil portion 110 and second coil portion 112 can be wound in a circular, obround, oval, polygonal (e.g., square, rectangle, etc.), and/or irregular shape. The first coil portion 110 and second coil portion 112 can be axially spaced apart from each other on the former 108. In some variants, the first coil portion 110 and second coil portion 112 may not be connected by way of a coiling. In some variants, the first coil portion 110 and second coil portion 112 can be portions of a same coil, which can include being connected by way of an intermediate coil portion with a reduced density of coiling. The first coil portion 110 and second coil portion 112 can be wound in a same direction about a mandrel.

The transducer assembly 100 can include a first magnet 114, which can be a permanent magnet. The first magnet 114 can include an annular, bar, or disc shape. The first magnet 114 can be disposed around the pole piece 104. The first magnet 114 can be coupled (e.g., bonded) to the yoke 102, which can include being coupled to the peripheral portion 106. The first magnet 114 can include a distal direction of magnetization in the direction of arrow 130.

The transducer assembly 100 can include a first plate 116 and/or second plate 118 (e.g., ferromagnetic elements). The first plate 116 and/or second plate 118 can include annular structures. The first plate 116 and/or second plate 118 can be made of a variety of materials, which can at least include ferromagnetic materials (e.g., steel, iron, etc.). The second plate 118 can be axially disposed between the first plate 116 and the first magnet 114. The second plate 118 can be coupled (e.g. bonded) to the first magnet 114. The first plate 116 and second plate 118 can project further radially inward toward the pole piece 104 compared to the first magnet 114. A first magnetic gap 120, which can also be referred to as an air gap, can be radially disposed between the first plate 116 and the pole piece 104. The first magnetic gap 120 can be radially disposed between the pole piece 104 and the portion of the first plate 116 closest to the pole piece 104. The closest portion of the first plate 116 can be the portion that is the shortest distance away from an outer surface of the pole piece 104 in a radial direction. A second magnetic gap 122, which can also be referred to as an air gap, can be radially disposed between the second plate 118 and the pole piece 104. The second magnetic gap 122 can be radially disposed between the pole piece 104 and the portion of the second plate 118 closest to the pole piece 104. The closest portion of the second plate 118 can be the portion that is the shortest distance away from an outer surface of the pole piece 104 in a radial direction. The first magnetic gap 120 and second magnetic gap 122 can be axially spaced apart from each other. The first magnetic gap 120 and second magnetic gap 122 can include magnetic flux in a same direction. The axial lengths of the first magnetic gap 120 and second magnetic gap 122 can be the same.

The transducer assembly 100 can include a region 124 of greater magnetic reluctance compared to the first magnetic gap 120 and second magnetic gap 122. The region 124 can be axially disposed between the first magnetic gap 120 and the second magnetic gap 122. The first plate 116 and second plate 118 can cooperate to form the region 124. The first plate 116 can include a first recess 126 in a radial direction relative to the axis 170 to form the region 124. The second plate 118 can include a second recess 128 in a radial direction relative to the axis 170 to form the region 124. The first recess 126 and second recess 128 can cooperate to form the region 124. In some variants, only one of the first recess 126 and second recess 128 form the region 124. The distance between the first plate 116 and the pole piece 104 can be smaller at the first magnetic gap 120 compared to the first recess 126. The distance between the second plate 118 and the pole piece 104 can be smaller at the second magnetic gap 122 compared to the second recess 128. The first recess 126 and second recess 128 can be respectively disposed at various locations on the first plate 116 and second plate 118. The first recess 126 and/or second recess 128 can be various shapes (e.g., polygonal in cross-sectional shape) and/or sizes. The first recess 126 can be disposed at a corner (e.g., inner and proximal corner) of the first plate 116, which can include forming a step (e.g., a step with two surfaces arranged approximately perpendicular relative to each other). The second recess 128 can be disposed at a corner (e.g., inner and distal corner) of the second plate 118, which can include forming a step (e.g., a step with two surfaces arranged approximately perpendicular relative to each other). The first recess 126 and second recess 128 can be in a mirrored arrangement relative to each other. The first recess 126 and second recess 128 can be adjacent to each other with the first plate 116 and second plate 118 coupled together. With the first plate 116 coupled to the second plate 118, the first recess 126 and second recess 128 can cooperate to form a substantially continuous recess in the coupled first plate 116 and second plate 118 to create the region 124. The substantially continuous recess can be generally U-shaped and open radially inward toward the axis 170. The first magnet 114, first plate 116, and/or second plate 118 can be collectively referred to as a magnetic structure.

The components and features of the transducer assembly 100 can be sized, shaped, and/or positioned to maintain a substantially consistent BL product with the transducer assembly driving through a stroke in first and second directions (e.g., distal and proximal directions). For example, the combined axial length of the first coil portion 110 and second magnetic gap 122 disposed in (e.g., immersed in) the first magnetic gap 120 and second magnetic gap 122 can be substantially the same throughout the stroke of the transducer assembly 100. The axial lengths of the first magnetic gap 120 and second magnetic gap 122 can be substantially the same. The axial lengths of the first coil portion 110 and second coil portion 112 can be substantially the same. The axial lengths of the first coil portion 110 and second coil portion 112 can be substantially the same as the combined axial lengths of the region 124 and the first magnetic gap 12. The axial lengths of the first coil portion 110 and second coil portion 112 can be substantially the same as the combined axial lengths of the region 124 and the second magnetic gap 122. The first coil portion 110 and second coil portion 112 can be axially spaced apart from each other a length that is substantially the same as the length of the first coil portion 110. The first coil portion 110 and second coil portion 112 can be axially spaced apart from each other a length that is substantially the same as the length of the second coil portion 112. In some variants, the first coil portion 110 and second coil portion 112 can be axially spaced apart from each other a length that is greater or smaller than the length of the first coil portion 110 and the length of the second coil portion 112. As illustrated in FIG. 1A, the first coil portion 110 can be disposed along (e.g., occupy) about half the axial length of the first magnetic gap 120 and the second coil portion 112 can be disposed along (e.g., occupy) about half the axial length of the second magnetic gap 122 with the transducer assembly 100 in a rest configuration, which can, in some variants, leave the region 124 not occupied by the first coil portion 110 or second coil portion 112. Accordingly, with the transducer assembly 100 at rest, the first coil portion 110 can be immersed along about half the axial length of the flux field of the first magnetic gap 120 and the second coil portion 112 can be immersed along about half the axial length of the flux field of the second magnetic gap 122.

The first coil portion 110 and second coil portion 112 disposed on the former 108 can move together in a same direction with the transducer assembly 100 driving. The first coil portion 110 and second coil portion 112 disposed on the former 108 can move in an oscillating manner with respect to the rest configuration illustrated in FIG. 1A, which can include axially moving about the same displacement in both directions (e.g., distal and proximal). The first coil portion 110 and second coil portion 112 disposed on the former 108 can experience a motive force proportional to the current flow through the first coil portion 110 and second coil portion 112 resulting from a voltage source, such as a musical signal or other arbitrary alternating current input such as from a power amplifier.

As described herein, the portion of the combined axial length of the first magnetic gap 120 and second magnetic gap 122 occupied by the first coil portion 110 and/or second coil portion 112 can be substantially consistent as the transducer assembly 100 drives in distal and proximal directions, which can provide a substantially consistent speaker force factor. For example, an approximate half of the combined axial lengths of the first magnetic gap 120 and second magnetic gap 122 can be occupied by the first coil portion 110 and/or second coil portion 112 while the transducer assembly 100 drives. The combined lengths of the first coil portion 110 and second coil portion 112 immersed within the first magnetic gap 120 and second magnetic gap 122 can be substantially the same while the transducer assembly 100 drives. The speaker force factor of the transducer assembly 100 at rest can be about fifty percent of the speaker force factor of an overhung motor with a gap height equal to the sum of the upper and lower gap heights.

As the first coil portion 110 and second coil portion 112 disposed on the former 108 are driven distally in the direction of arrow 130, the first coil portion 110 can move out of the first magnetic gap 120 as more of the second coil portion 112 moves into the second magnetic gap 122 to maintain a substantially consistent speaker force factor. With the entirety of the first coil portion 110 disposed outside the first magnetic gap 120, the second coil portion 112 can occupy an entirety of the axial length of the second magnetic gap 122, then portions of the axial lengths of the first magnetic gap 120 and the second magnetic gap 122, and then substantially an entirety of the axial length of the first magnetic gap 120 to maintain a substantially consistent speaker force factor as the first coil portion 110 and second coil portion 112 disposed on the former 108 are driven distally in the direction of arrow 130.

As the first coil portion 110 and second coil portion 112 disposed on the former 108 are driven proximally in the direction opposite of arrow 130, the second coil portion 112 can move out of the second magnetic gap 122 as more of the first coil portion 110 moves into the first magnetic gap 120 to maintain a substantially consistent speaker force factor. With the entirety of the second coil portion 112 disposed outside the second magnetic gap 122, the first coil portion 110 can occupy an entirety of the axial length of the first magnetic gap 120, then portions of the axial lengths of the first magnetic gap 120 and the second magnetic gap 122, and then substantially an entirety of the axial length of the second magnetic gap 122 to maintain a substantially consistent speaker force factor as the first coil portion 110 and the second coil portion 112 disposed on the former 108 are driven proximally opposite the direction of arrow 130.

The transducer assembly 100 can be incorporated into a loudspeaker assembly which can at least include a diaphragm, spider, surround, enclosure, frame, baffle, dust cap, and/or other features. The transducer assembly 100 can include additional enhancing features, which can at least include geometry to promote airflow and/or conductive metallic elements (e.g., ring and/or stationary coil) to provide electromagnetic shorting and/or reduction of electrical inductance of the coils either at rest or in motion. The metallic elements can at least be placed above, within, or below the gaps.

Figure 1A:
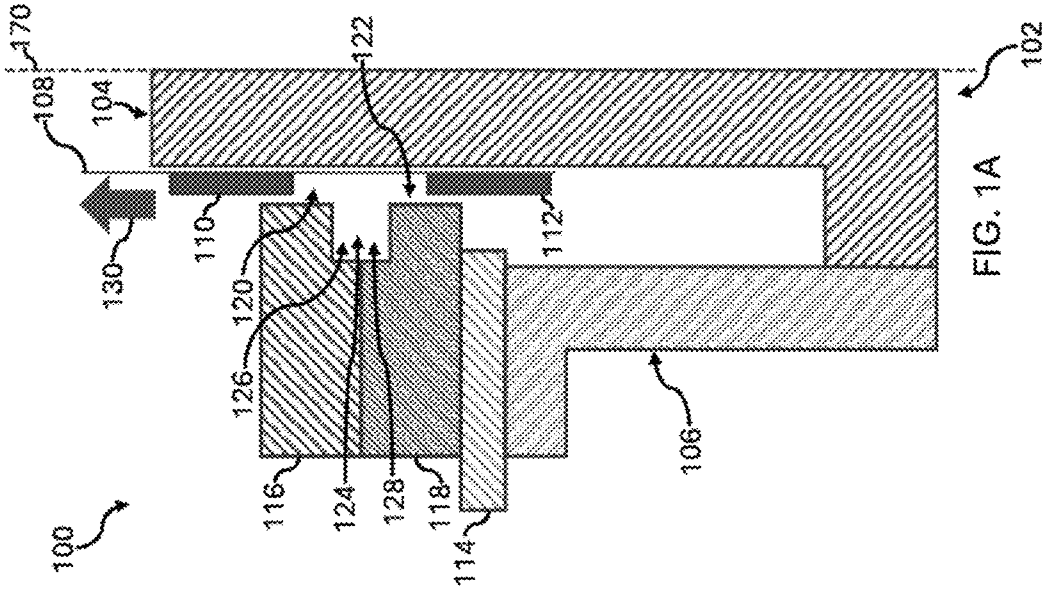
FIG. 1A illustrates half of a sectioned view of a transducer assembly for a loudspeaker at rest, wherein the transducer assembly includes a yoke with a pole piece, a first magnet, a first plate, a second plate, a first magnetic gap between the pole piece and the first plate, a second magnetic gap between the pole piece and the second plate, a region of greater magnetic reluctance between the first magnetic gap and the second magnetic gap, and a former disposed about the pole piece with a first coil portion and a second coil portion disposed on the former. As illustrated, the first coil portion is disposed along about fifty percent of an axial length of the first magnetic gap and the second coil portion is disposed along about fifty percent of an axial length of the second magnetic gap.

FIG. 1B illustrates the first coil portion 110 and second coil portion 112 disposed on the former 108 moving distally in the direction of arrow 130 with current having a first polarity flowing through the first coil portion 110 and second coil portion 112. As illustrated, the first coil portion 110 can move to substantially outside of the first magnetic gap 120 and the second coil portion 112 can move to be disposed along substantially an entirety of the axial length of the second magnetic gap 122, which can provide about the same speaker force factor (e.g., one hundred percent) as the transducer assembly 100 at rest in the configuration illustrated in FIG. 1A. The rate that the first coil portion 110 leaves the axial length of the first magnetic gap 120 can be about the same as the rate that the second coil portion 112 moves to occupy the axial length of the second magnetic gap 122.

Figure 1E:
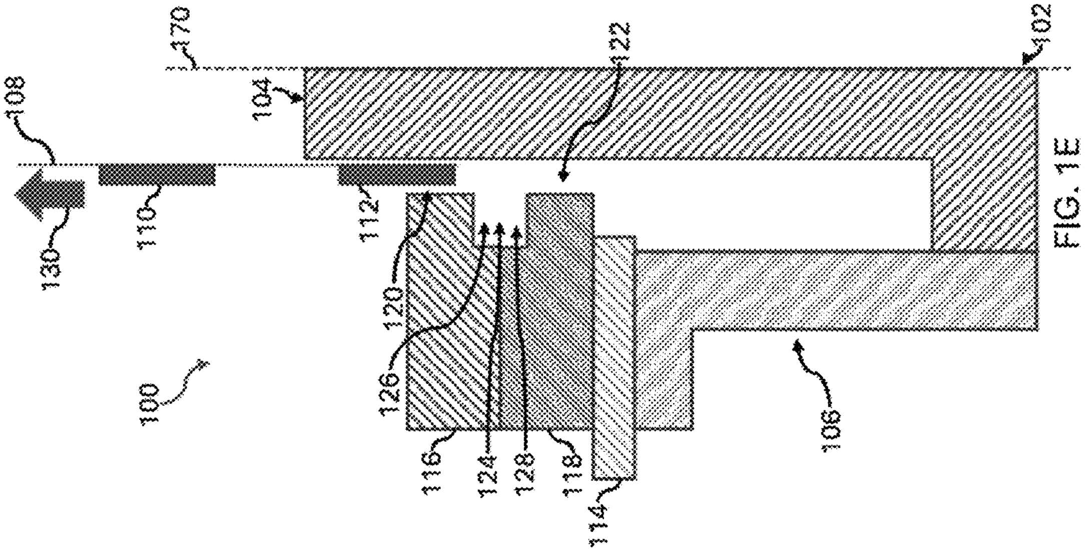
FIG. 1E illustrates the transducer assembly of FIG. 1A continuing to drive in the first direction from the configuration illustrated in FIG. 1D with the first coil portion disposed entirely out of the first magnetic gap and the second coil portion disposed along about seventy percent of the axial length of the first magnetic gap.
Figure 1D:
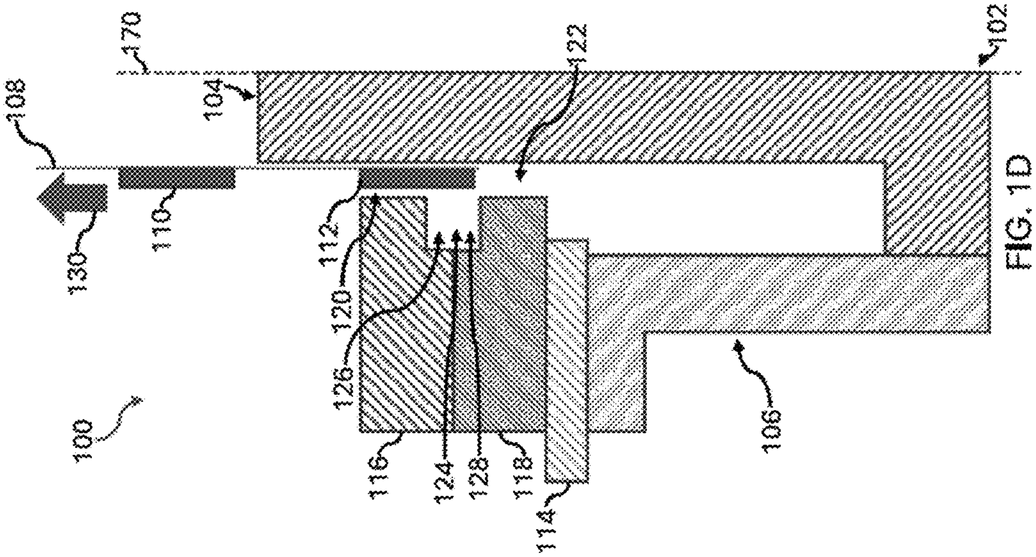
FIG. 1D illustrates the transducer assembly of FIG. 1A continuing to drive in the first direction from the configuration illustrated in FIG. 1C with the first coil portion disposed substantially entirely out of the first magnetic gap and the second coil portion disposed along about an entirety of an axial length of the region of greater magnetic reluctance and substantially an entirety of the axial length of the first magnetic gap.
Figure 1C:
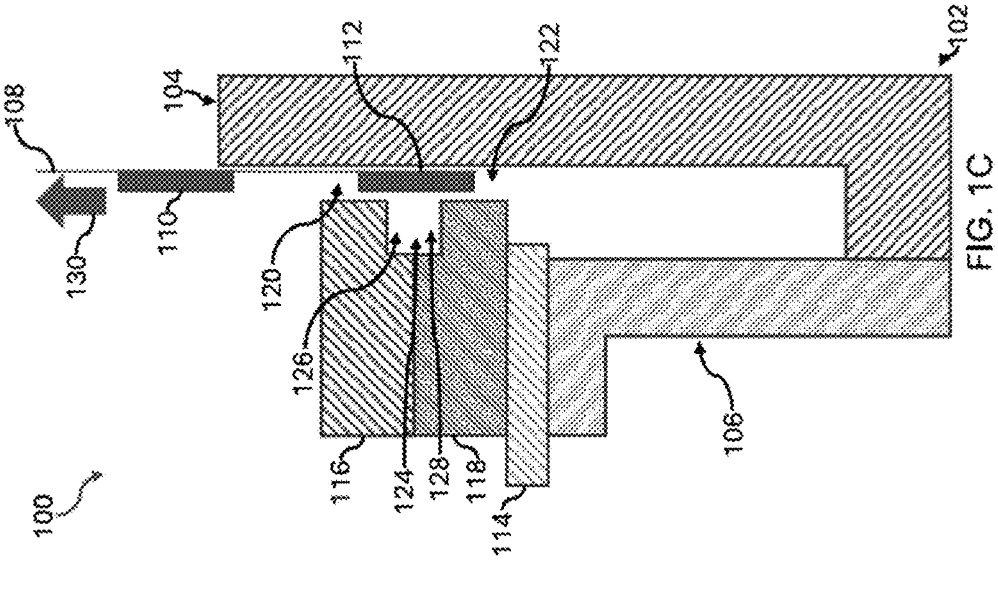
FIG. 1C illustrates the transducer assembly of FIG. 1A continuing to drive in the first direction from the configuration illustrated in FIG. 1B with the first coil portion disposed entirely out of the first magnetic gap and the second coil portion disposed along about fifty percent of the axial length of the second magnetic gap, an entirety of an axial length of the region of greater magnetic reluctance, and about fifty percent of the axial length of the first magnetic gap.

FIG. 1C illustrates the first coil portion 110 and the second coil portion 112 disposed on the former 108 moving further distally in the direction of arrow 130 relative to the configuration illustrated in FIG. 1B. As illustrated, the first coil portion 110 can continue to move distally while outside of the first magnetic gap 120 and the second coil portion 112 can move to be disposed along about half of the axial length of the first magnetic gap 120, an entirety of an axial length of the region 124, and about half of the axial length of the second magnetic gap 122, which can provide about the same speaker force factor (e.g., one hundred percent) as the transducer assembly 100 at rest in the configuration illustrated in FIG. 1A. The rate that the second coil portion 112 leaves the axial length of the second magnetic gap 122 can be about the same as the rate that the second coil portion 112 moves to occupy the axial length of the first magnetic gap 120. The first coil portion 110 and the second coil portion 112 can be in series such that the induced back electromotive force of the second coil portion 112 reduces current flow through the first coil portion 110 which is outside the first magnetic gap 120 (e.g., in free air) to reduce current-related heating of the coil winding and prevent overheating.

FIG. 1D illustrates the first coil portion 110 and the second coil portion 112 disposed on the former 108 moving further distally in the direction of arrow 130 relative to the configuration illustrated in FIG. 1C. As illustrated, the first coil portion 110 can continue to move distally while outside the first magnetic gap 120 and the second coil portion 112 can move to be disposed along about an entirety of the axial length of the first magnetic gap 120 and about the axial length of the region 124, which can provide about the same speaker force factor (e.g., one hundred percent) as the transducer assembly 100 at rest in the configuration illustrated in FIG. 1A.

In some variants, as illustrated in FIG. 1E, the first coil portion 110 and the second coil portion 112 disposed on the former 108 can continue to move further distally in the direction of arrow 130 relative to the configuration illustrated in FIG. 1D. As illustrated, the first coil portion 110 can continue to move distally while outside the first magnetic gap 120 and the second coil portion 112 can move to be disposed partially distal of the first magnetic gap 120 and along about seventy percent of the axial length of the first magnetic gap 120, which can provide about seventy percent of the speaker force factor as the transducer assembly 100 at rest in the configuration illustrated in FIG. 1A. Seventy percent of the rest speaker force factor may be the BL-limited Xmax of the transducer assembly 100, which may correspond to about thirty-five percent of the speaker force factor of an overhung motor with gap height equal to the sum of the upper and the lower gap heights. In some variants, the first coil portion 110 and the second coil portion 112 disposed on the former 108 can continue to move further distally such that the second coil portion 112 is disposed along about 90, 80, 70, 60, or 50 or less percent or any percentages between any of the foregoing of the axial length of the first magnetic gap 120.

Figure 2B:
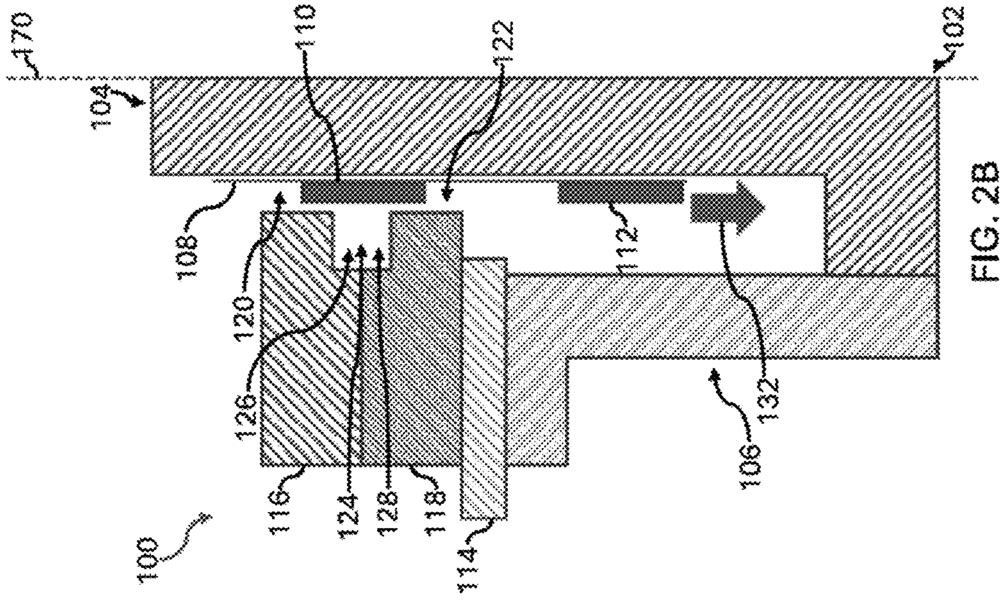
FIG. 2B illustrates the transducer assembly of FIG. 1A driving in the second direction from the configuration illustrated in FIG. 2A with the first coil portion disposed along about fifty percent of the axial length of the first magnetic gap, an entirety of the axial length of the region of greater magnetic reluctance, and about fifty percent of the axial length of the second magnetic gap and the second coil portion disposed entirely out of the second magnetic gap.
Figure 2A:
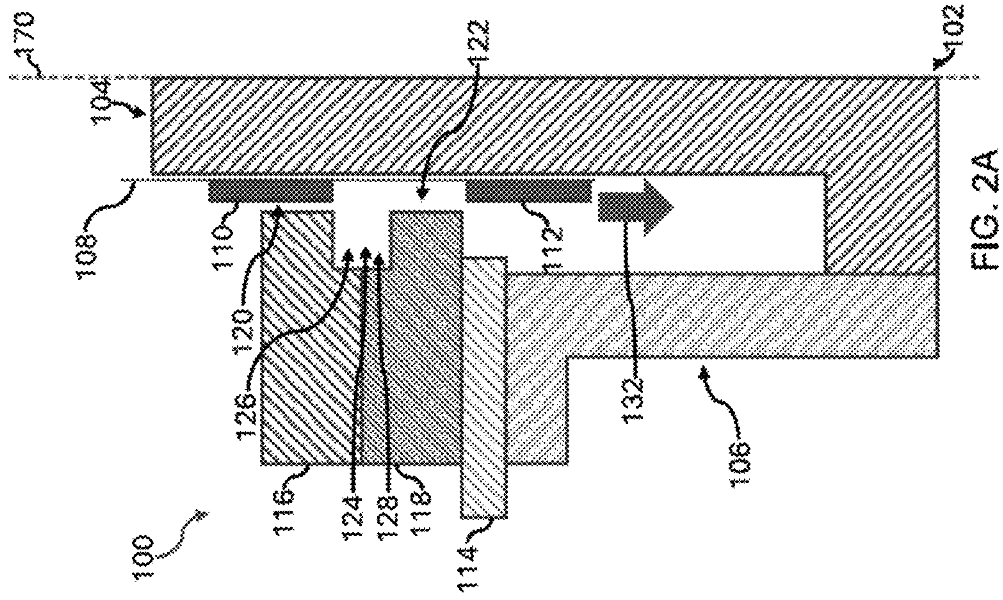
FIG. 2A illustrates the transducer assembly of FIG. 1A driving in a second direction, after moving in the second direction from the configuration illustrated in FIG. 1E back through the configurations illustrated in FIGS. 1D, 1C, 1B, and 1A, with the first coil portion disposed along substantially an entirety of the axial length of the first magnetic gap and the second coil portion disposed substantially out of the second magnetic gap.

FIG. 2A illustrates the first coil portion 110 and the second coil portion 112 disposed on the former 108 moving proximally in the direction of arrow 132 with a current of a second polarity (e.g., reversed from the first polarity) flowing through the first coil portion 110 and second coil portion 112. The first coil portion 110 and the second coil portion 112 disposed on the former 108 can move back proximally through the configurations illustrated in FIGS. 1D, 1C, 1B, and 1A until arriving at the configuration illustrated in FIG. 2A. As illustrated in FIG. 2A, the first coil portion 110 can move to be disposed along about an entirety of the axial length of the first magnetic gap 120 and the second coil portion 112 can move to be disposed substantially outside of the second magnetic gap 122, which can provide about the same speaker force factor (e.g., one hundred percent) as the transducer assembly 100 at rest in the configuration illustrated in FIG. 1A.

FIG. 2B illustrates the first coil portion 110 and the second coil portion 112 disposed on the former 108 moving further proximally in the direction of arrow 132 relative to the configuration illustrated in FIG. 2A. As illustrated, the first coil portion 110 can move to be disposed along about half of the axial length of the first magnetic gap 120, an entirety of the axial length of the region 124, and about half of the axial length of the second magnetic gap 122 and the second coil portion 112 can continue to move proximally while outside of the second magnetic gap 122, which can provide about the same speaker force factor (e.g., one hundred percent) as the transducer assembly 100 at rest in the configuration illustrated in FIG. 1A. The rate that the first coil portion 110 leaves the axial length of the first magnetic gap 120 can be about the same as the rate that the first coil portion 110 occupies the axial length of the second magnetic gap 122. The first coil portion 110 and the second coil portion 112 can be in series such that the induced back electromotive force of the first coil portion 110 reduces current flow through the second coil portion 112 which is outside the second magnetic gap 122 (e.g., in free air) to reduce current-related heating of the coil winding and prevent overheating.

Figure 2D:
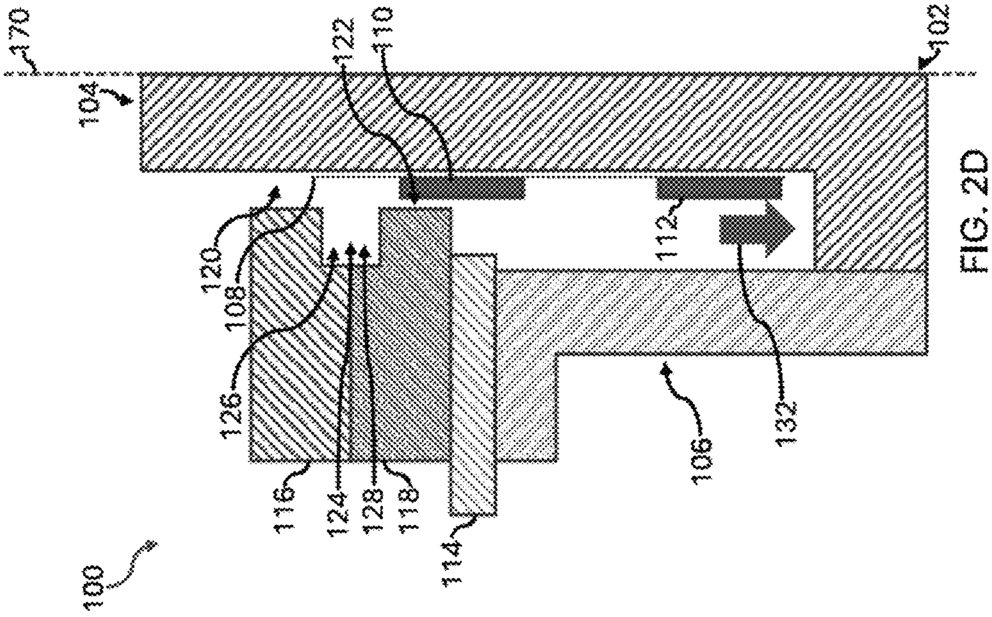
FIG. 2D illustrates the transducer assembly of FIG. 1A driving in the second direction from the configuration illustrated in FIG. 2C with the first coil portion disposed along about seventy percent of the axial length of the second magnetic gap and the second coil portion disposed entirely out of the second magnetic gap.
Figure 2C:
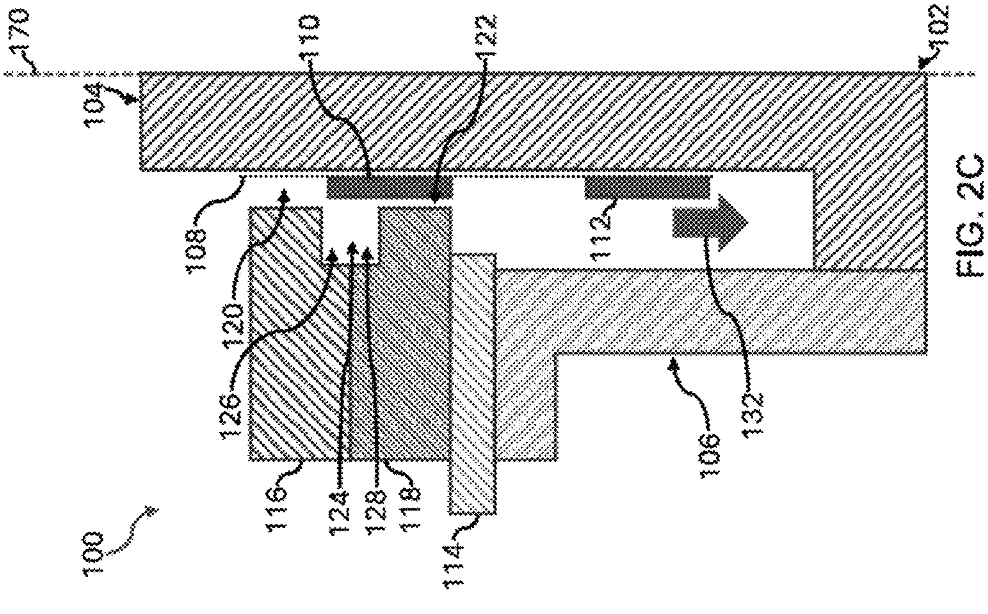
FIG. 2C illustrates the transducer assembly of FIG. 1A driving in the second direction from the configuration illustrated in FIG. 2B with the first coil portion disposed along about an entirety of the axial length of the region of greater magnetic reluctance and about an entirety of the axial length of the second magnetic gap and the second coil portion disposed entirely out of the second magnetic gap.

FIG. 2C illustrates the first coil portion 110 and the second coil portion 112 disposed on the former 108 moving further proximally in the direction of arrow 132 relative to the configuration illustrated in FIG. 2B. As illustrated, the second coil portion 112 can continue to move proximally while outside the second magnetic gap 122 and the first coil portion 110 can move to be disposed along about an entirety of the axial length of the second magnetic gap 122 and the axial length of the region 124, which can provide about the same speaker force factor (e.g., one hundred percent) as the transducer assembly 100 at rest in the configuration illustrated in FIG. 1A.

In some variants, as illustrated in FIG. 2D, the first coil portion 110 and the second coil portion 112 disposed on the former 108 can continue to move further proximally in the direction of arrow 132 relative to the configuration illustrated in FIG. 2C. As illustrated, the second coil portion 112 can continue to move proximally while outside the second magnetic gap 122 and the first coil portion 110 can move to be disposed partially proximal of the second magnetic gap 122 and along about seventy percent of the axial length of the second magnetic gap 122, which can provide about seventy percent of the speaker force factor as the transducer assembly 100 at rest in the configuration illustrated in FIG. 1A. Seventy percent of the rest speaker force factor may be the BL-limited Xmax of the transducer assembly 100, which may correspond to thirty-five percent of the speaker force factor of an overhung motor with a gap height equal to the sum of the upper and the lower gap heights. In some variants, the first coil portion 110 and the second coil portion 112 disposed on the former 108 can continue to move further proximally such that the second coil portion 112 is disposed along about 90, 80, 70, 60, or 50 or less percent or any percentage between any of the foregoing of the axial length of the second magnetic gap 122.

Figure 3:
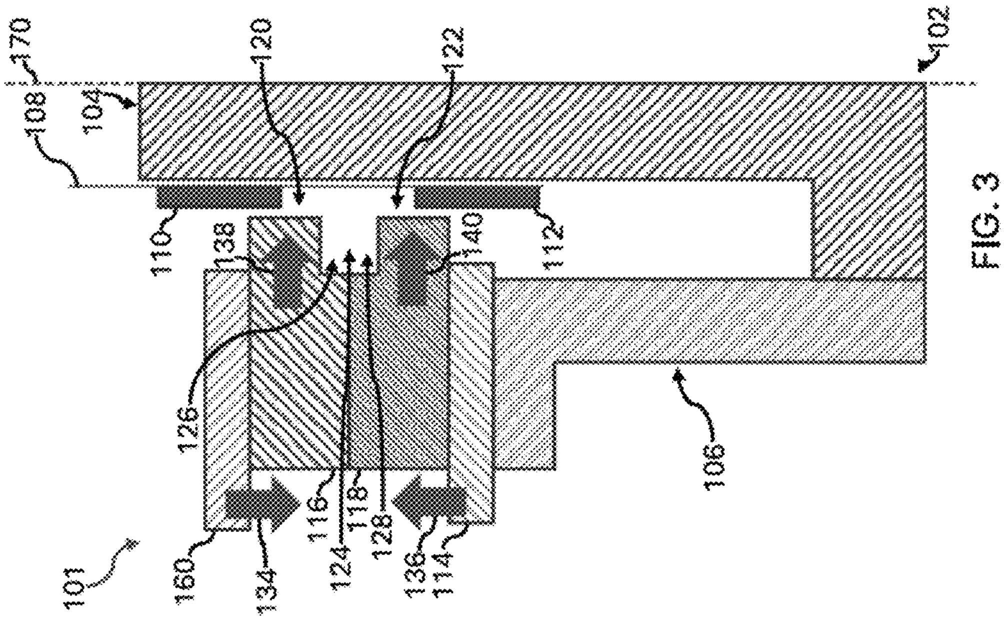
FIG. 3 illustrates a transducer assembly with the components of the transducer assembly of FIG. 1A and a second magnet, wherein the first plate and the second plate are disposed between the first magnet and the second magnet.

FIG. 3 illustrates a transducer assembly 101 that can include at least any of the features of the transducer assembly 100 as well as the other transducers assemblies disclosed herein. The transducer assembly 101 can include a second magnet 160, which can at least include any of the features of the first magnet 114. The second magnet 160 can be disposed on (e.g., bonded to) a distal surface of the first plate 116. The first plate 116 and second plate 118 can be disposed between the first magnet 114 and second magnet 160. The second magnet 160 can include a direction of magnetization that is opposite the direction of magnetization of the first magnet 114. For example, the first magnet 114 can include a distal direction of magnetization in the direction of arrow 136, and the second magnet 160 can include a proximal direction of magnetization in the direction of arrow 134. This arrangement may be desirable to supply additional magnetic flux and/or to improve (e.g., optimize) the flow and/or distribution of magnetic flux in the magnetic assembly and/or between the first magnetic gap 120 and the second magnetic gap 122 in order to produce magnetic flux in each gap that is in a same direction, as illustrated by arrows 138 and 140. The direction of magnetic flux of the first plate 116 and second plate 118 can be radially inward.

Figure 4B:
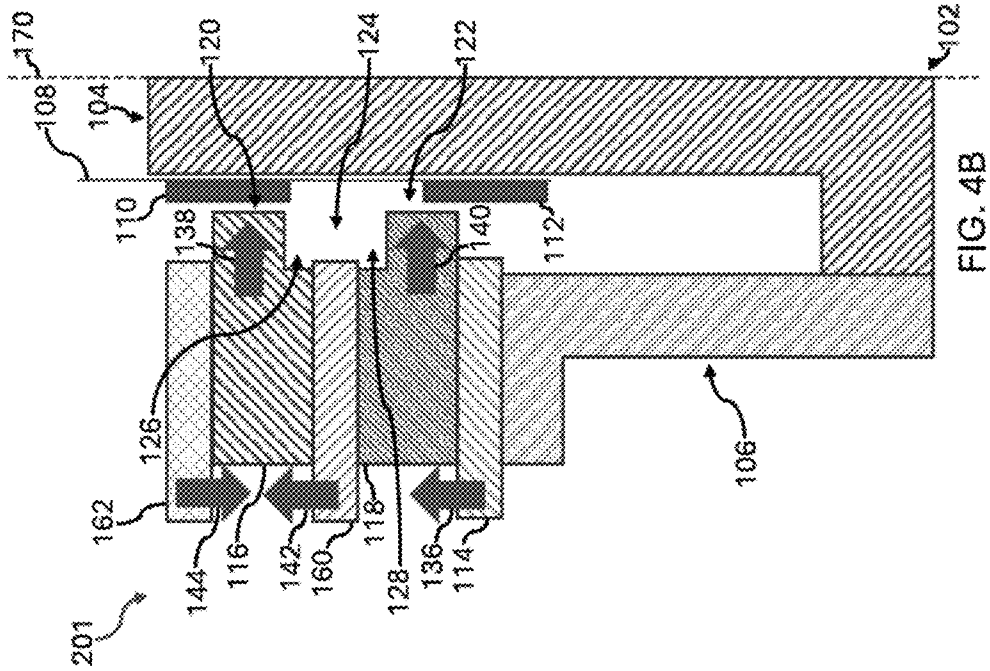
FIG. 4B illustrates half of a sectioned view of a transducer assembly with the components of the transducer assembly of FIG. 4B and with a third magnet, wherein the first plate is disposed between the third magnet and the second magnet and the second plate is disposed between the first magnet and the second magnet.
Figure 4A:
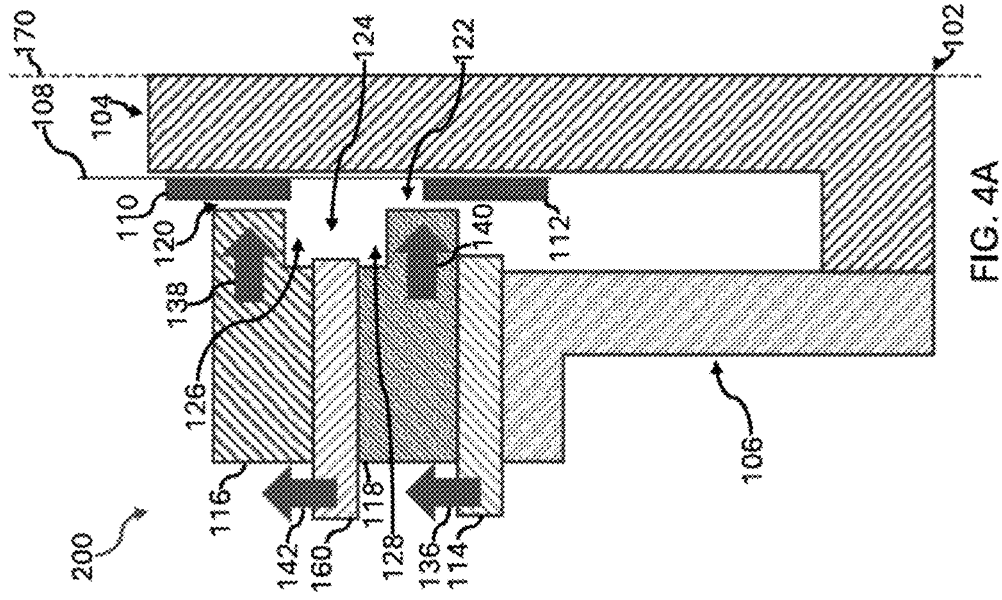
FIG. 4A illustrates half of a sectioned view of a transducer assembly with the components of the transducer assembly of FIG. 3 but with the second magnet disposed between the first plate and the second plate.

FIG. 4A illustrates a transducer assembly 200 that can include at least any of the features of the transducer assembly 101 as well as the other transducers assemblies disclosed herein. The transducer assembly 200 can include the second magnet 160. The second magnet 160 can be disposed between the first plate 116 and the second plate 118, which can at least include being bonded to a proximal-facing surface of the first plate 116 and/or a distal-facing surface of the second plate 118. The second magnet 160 can axially space the first plate 116 and the second plate 118 apart from each other, which can axially lengthen the region 124. The second magnet 160 can include a direction of magnetization that is the same as the direction of magnetization of the first magnet 114. For example, the first magnet 114 can include a distal direction of magnetization in the direction of arrow 136, and the second magnet 160 can include a distal direction of magnetization in the direction of arrow 142. This arrangement may be desirable to supply additional magnetic flux and/or to improve (e.g., optimize) the flow and/or distribution of magnetic flux in the magnetic assembly and/or between the first magnetic gap 120 and the second magnetic gap 122.

FIG. 4B illustrates a transducer assembly 201 that can include at least any of the features of the transducer assembly 200 as well as the other transducers assemblies disclosed herein. The transducer assembly 201 can include a third magnet 162, which can at least include any of the features of the first magnet 114 and/or second magnet 160. The third magnet 162 can be disposed on (e.g., bonded to) the first plate 116, which can include a distal-facing surface of the first plate 116. The first plate 116 can be disposed between the second magnet 160 and third magnet 162. The second plate 118 can be disposed between the first magnet 114 and the second magnet 160. The third magnet 162 can include a direction of magnetization that is opposite the directions of magnetization of the second magnet 160 and/or first magnet 114. For example, the third magnet 162 can include a proximal direction of magnetization in the direction of arrow 144, and the first magnet 114 and/or second magnet 160 can include distal directions of magnetization in the directions of arrow 136 and arrow 142, respectively. This arrangement may be desirable to supply additional magnetic flux and/or to improve (e.g., optimize) the flow and/or distribution of magnetic flux in the magnetic assembly and/or between the first magnetic gap 120 and the second magnetic gap 122.

Figure 5:
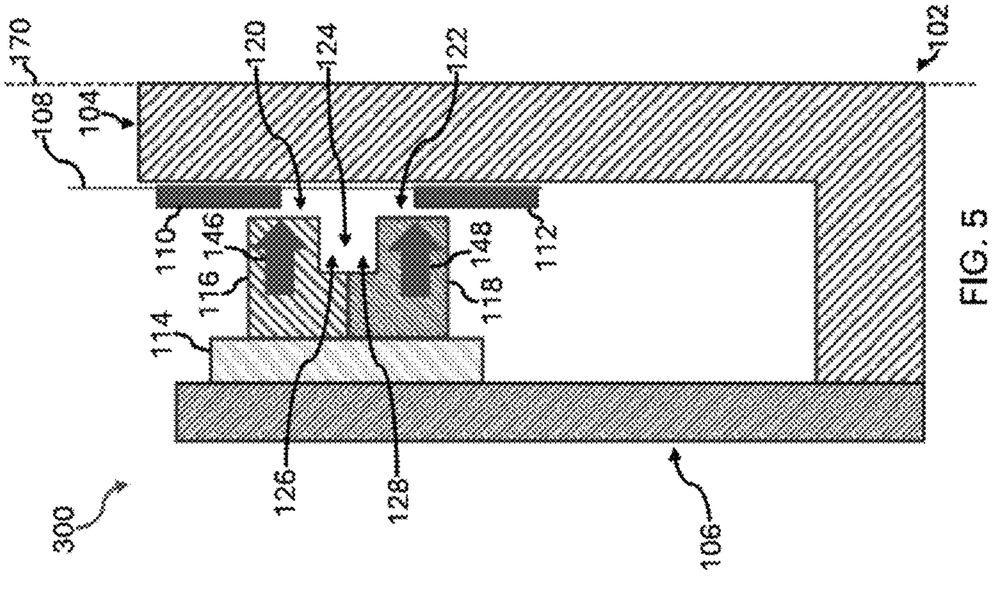
FIG. 5 illustrates half of a sectioned view of a transducer assembly with the components of the transducer assembly of FIG. 1A but with the first magnet disposed radially outward of the first plate and the second plate.

FIG. 5 illustrates a transducer assembly 300 that can include at least any of the features of the transducer assembly 100 as well as the other transducer assemblies disclosed herein. The first magnet 114 can be oriented to have a radially-inward direction of magnetization that is radially inward relative to the pole piece 104 and/or axis 170. The first magnet 114 can be oriented to have a radially-inward direction of magnetization that is perpendicular relative to the direction of flux in the first magnetic gap 120 and/or second magnetic gap 122. The first magnet 114 can be disposed on (e.g., bonded to) the peripheral portion 106, which can include a radially-inward facing surface of the peripheral portion 106. The first plate 116 and/or second plate 118 can be disposed between the first magnet 114 and the pole piece 104. The first plate 116 and/or second plate 118 can be disposed on (e.g., bonded to) the first magnet 114, which can include a radially-ward facing surface of the peripheral portion 106. The first magnet 114 can be radially disposed between the first plate 116 and the peripheral portion 106. The first magnet 114 can be radially disposed between the second plate 118 and the peripheral portion 106. The magnetic flux of the first plate 116 and second plate 118 can be in a same direction, as illustrated by arrows 146, 148.

Figure 6:
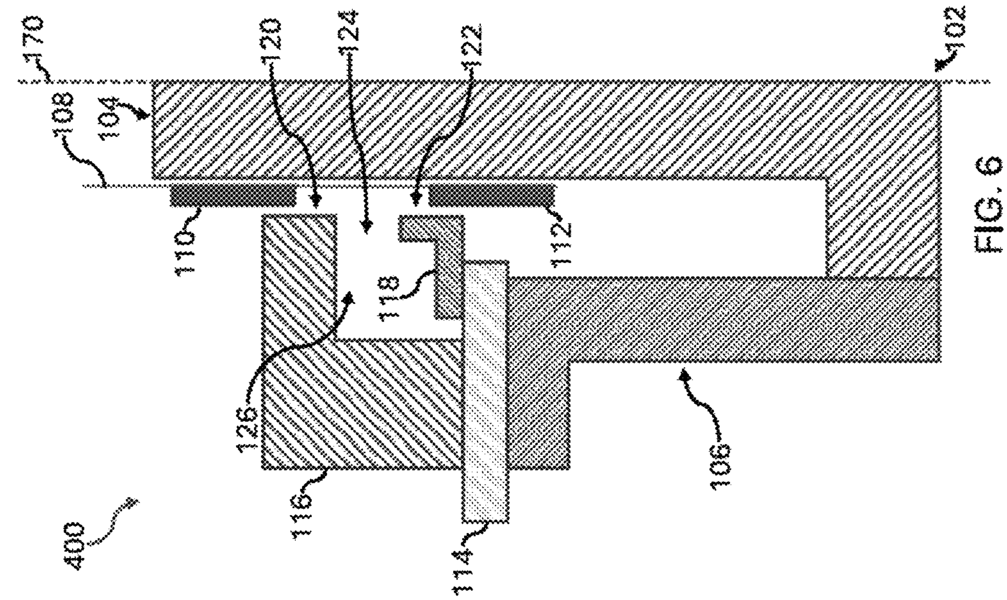
FIG. 6 illustrates half of a sectioned view of a transducer assembly with the components of the transducer assembly of FIG. 1A but with the first plate coupled to the first magnet at a first location that is radially outward of a second location where the second plate is coupled to the first magnet.

FIG. 6 illustrates a transducer assembly 400 that can include at least any of the features of the transducer assembly 100 as well as the other transducer assemblies disclosed herein. The first plate 116 can be disposed on (e.g., bonded to) the first magnet 114. The second plate 118 can be disposed on (e.g., bonded to) the first magnet 114. The first plate 116 and second plate 118 can be concentrically positioned relative to each other. The second plate 118 can be positioned radially inward of the first plate 116. The second plate 118 can be coupled to the first magnet 114 at a location that is radially inward relative to the location at which the first plate 116 is coupled to the first magnet 114. The second plate 118 can be disposed in the first recess 126 of the first plate 116. The first plate 116 can include an inverted L-shape with an end of the stem disposed on (e.g., bonded to) the first magnet 114 and the leg protruding radially inward toward the pole piece 104 and/or axis 170 to form the first magnetic gap 120. The second plate 118 can be an L-shape with an elongate side of the stem disposed on (e.g., bonded to) the first magnet 114 and the leg protruding distally in a direction generally parallel to the axis 170 and/or pole piece 104 to form the second magnetic gap 122. The cross-section (e.g., radial cross-section) of the second plate 118 can be thinner relative to the cross-section (e.g., radial cross-section) of the first plate 116. In some variants, this arrangement can balance the travel of magnetic flux between the first magnetic gap 120 and second magnetic gap 122 by using a magnetic saturation condition of one or both of the first plate 116 and the second plate 118.

Figure 7:
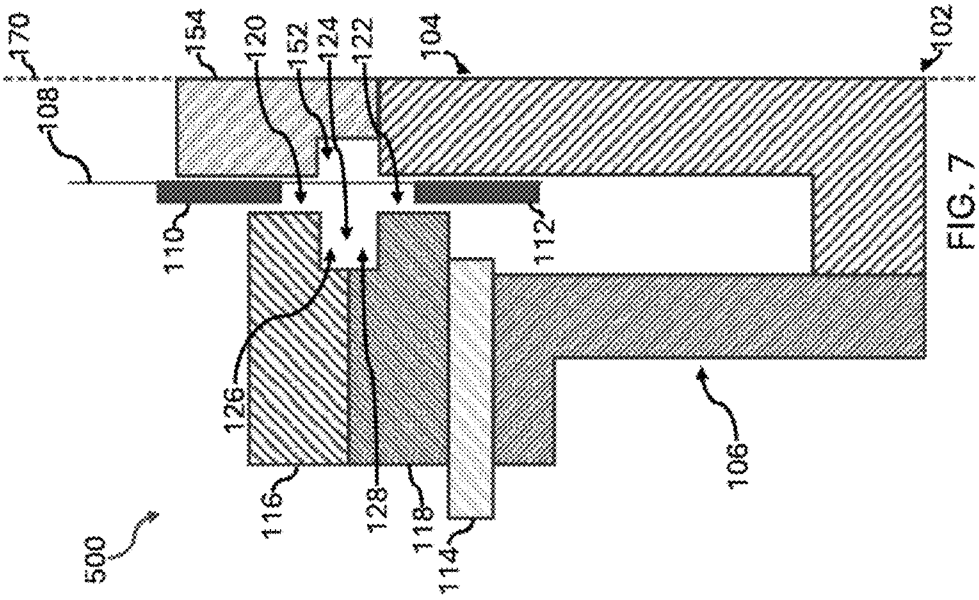
FIG. 7 illustrates half of a sectioned view of a transducer assembly with the components of the transducer assembly of FIG. 1A and with a pole piece component coupled to the pole piece, wherein the pole piece component includes a recess axially aligned with the region of greater reluctance.

FIG. 7 illustrates a transducer assembly 500 that can include at least any of the features of the transducer assembly 100 as well as the other transducer assemblies disclosed herein. The pole piece 104 can include a recess 152 (e.g., notch, channel). The recess 152 can be axially aligned with the region 124 such that the region 124 is radially outward of the recess 152. The region 124 and recess 152 can together increase magnetic reluctance between the first magnetic gap 120 and second magnetic gap 122, which can include providing greater magnetic reluctance than could be achieved with only one radial side of the first coil portion 110, second coil portion 112, and former 108. The pole piece 104 can include a pole piece component 154 that can be coupled to the pole piece 104 (e.g., distal end of the pole piece 104). The pole piece component 154 can include the recess 152. The pole piece component 154 can be disposed on a distal end of the pole piece 104. Any of the pole piece 104, yoke 102, first plate 116, second plate 118, and/or any ferromagnetic (e.g., steel) component of the magnetic structure can be divided into two or more components, which may aid in manufacturing and/or assembly. Multiple components for a feature can be used, in some variants, without substantially altering the travel of magnetic flux of the transducer assembly 500. A component of the magnetic structure may be made common with a frame member of the speaker frame comprised of ferromagnetic material.

Figure 8:
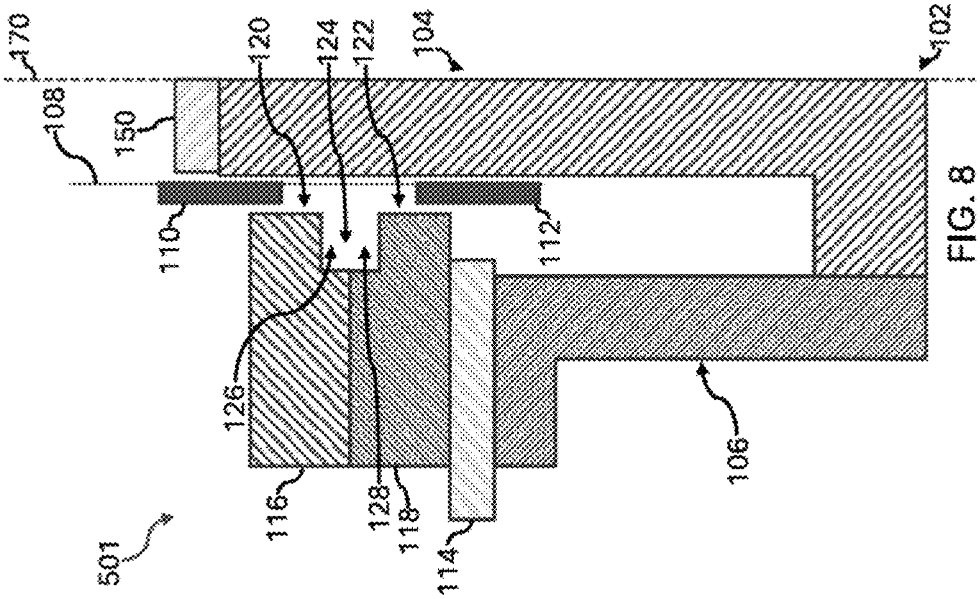
FIG. 8 illustrates half of a sectioned view of a transducer assembly with all the components of the transducer assembly of FIG. 1A and with a cap magnet coupled to the pole piece.

FIG. 8 illustrates a transducer assembly 501 that can include at least any of the features of the transducer assembly 100 as well as the other transducer assemblies disclosed herein. The transducer assembly 501 can include a cap magnet 150. The cap magnet 150 can be disposed on (e.g., bonded to) the pole piece 104 of the yoke 102, which can include a distal end of the pole piece 104. The cap magnet 150 can provide focusing and/or enhanced magnetic saturation of ferromagnetic components of the transducer assembly 501 and/or an additional return path for the magnet circuit. The cap magnet 150, in some variants, can have an outer periphery that does not extend radially outward of an outer periphery of the pole piece 104. The cap magnet 150 can include any of the features of the first magnet 114 or other magnets described herein.

Figure 9:
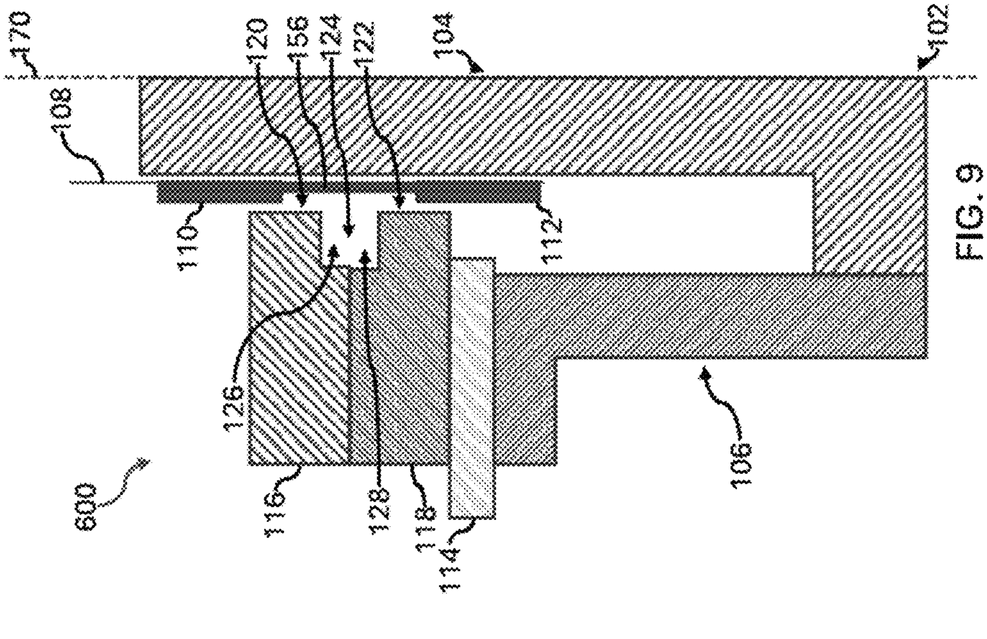
FIG. 9 illustrates half of a sectioned view of a transducer assembly with the components of the transducer assembly of FIG. 1A but with an intermediate coil portion with a reduced winding density spanning between the first coil portion and the second coil portion.

FIG. 9 illustrates a transducer assembly 600 that can include at least any of the features of the transducer assembly 100 as well as the other transducer assemblies disclosed herein. In some variants, the first coil portion 110 and second coil portion 112 can be formed with a continuous coil winding body (e.g., coiled wire) disposed around the former 108. In some variants, the first coil portion 110 and second coil portion 112 can be formed with one or more continuous layers of coil windings disposed around the former 108. The coil winding body can be disposed around (e.g., wound around) the former 108 and distributed axially thereon to form the first coil portion 110, second coil portion 112, and an intermediate coil portion 156 between the first coil portion 110 and second coil portion 112. The intermediate coil portion 156 can include a reduced winding density compared to the first coil portion 110 and second coil portion 112. The intermediate coil portion 156 can connect the first coil portion 110 and second coil portion 112 to facilitate a continuous coil winding body, which can permit winding of the first coil portion 110 and second coil portion 112 as a single winding body. The intermediate coil portion 156 can span between the first coil portion 110 and second coil portion 112. The first coil portion 110 and second coil portion 112 can include an increased density (e.g., additional layers) of the coil winding body compared to the intermediate coil portion 156, which can include a reduced winding density of the coil winding body. The first coil portion 110 can be disposed on a distal portion of the former 108. The second coil portion 112 can be disposed on a proximal portion of the former 108. This arrangement can provide a more continuous drive force and/or avoid a discontinuity in the drive force.

Figure 10:
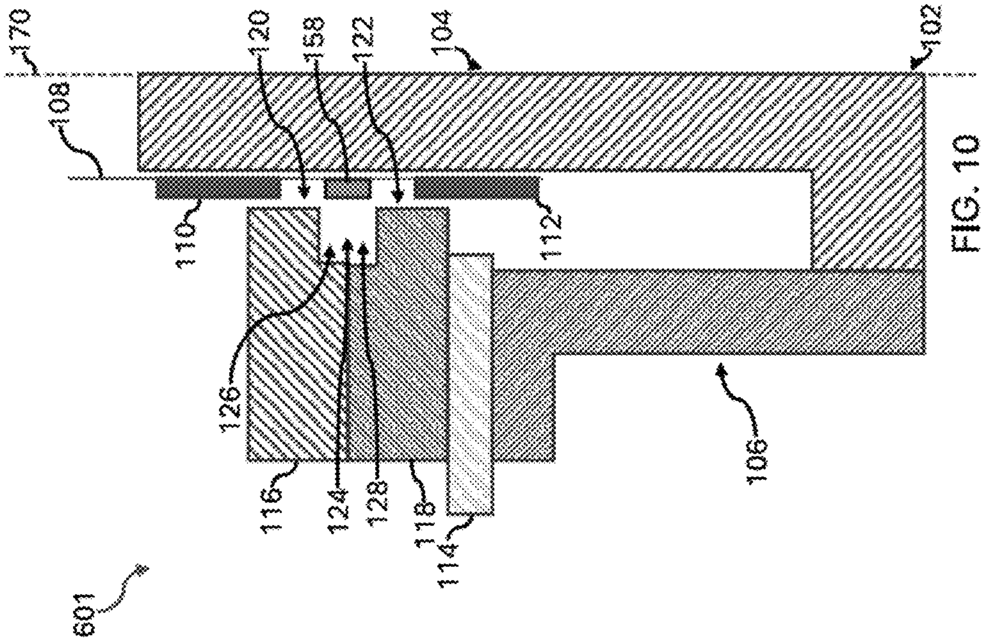
FIG. 10 illustrates half of a sectioned view of a transducer assembly with the components of the transducer assembly of FIG. 1A but with an accessory coil axially disposed on the former between the first coil portion and the second coil portion.

FIG. 10 illustrates a transducer assembly 601 that can include at least any of the features of the transducer assembly 100 as well as the other transducer assemblies disclosed herein. The transducer assembly 601 can include an accessory coil portion 158 (e.g., accessory coil winding body, conductive element forming an accessory electrical loop), which can include an additional wire coil or closed ring of conductive material forming a continuous or electrically shorted accessory loop. The accessory coil portion 158 can be disposed on (e.g., bonded to) the former 108. The accessory coil portion 158 can be disposed around the former 108. The accessory coil portion 158 can include a wire coil or closed ring that is separate from the first coil portion 110 and/or second coil portion 112. The accessory coil portion 158 can be disposed axially between the first coil portion 110 and second coil portion 112. The accessory coil portion 158 can provide electromechanical damping and/or braking of the motion of the transducer assembly 601. In some variants, the accessory coil portion 158 can be used for position sensing, velocity sensing, temperature sensing, and/or proximity sensing, and the accessory coil may work together with another stationary accessory coil provided in an adjacent area of the motor assembly to perform these sensing or braking functions.

Figure 11:
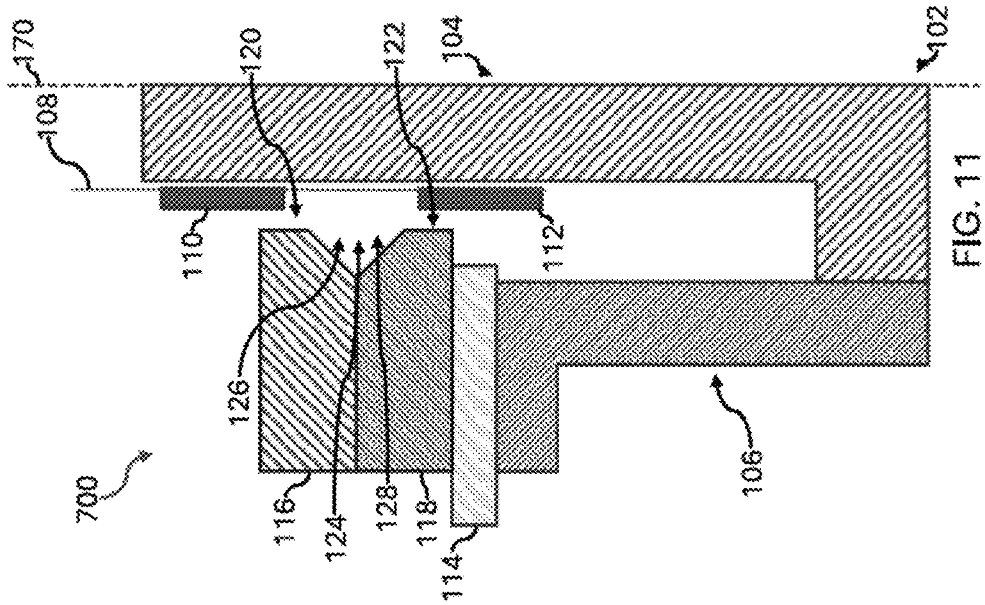
FIG. 11 illustrates half of a sectioned view of a transducer assembly with the components of the transducer assembly of FIG. 1A but with tapered recesses in the first plate and the second plate at the region of greater reluctance.

FIG. 11 illustrates a transducer assembly 700 that can include at least any of the features of the transducer assembly 100 as well as the other transducer assemblies disclosed herein. The first recess 126 of the first plate 116 can be tapered, which can gradually decrease the radial width of the region 124 distally. The second recess 128 of the second plate 118 can be tapered, which can gradually decrease the radial width of the region 124 proximally. The arrangement of the second recess 128 can mirror the arrangement of the first recess 126. The rate of tapering of the first recess 126 can be the same as the rate of tapering of the second recess 128. The characteristics (e.g., size and/or shape) of the first recess 126 and second recess 128 can be altered, such as illustrated in FIG. 11, to provide a particular characteristic distribution of magnet flux in the region 124 between the first magnetic gap 120 and second magnetic gap 122.

Figure 12:
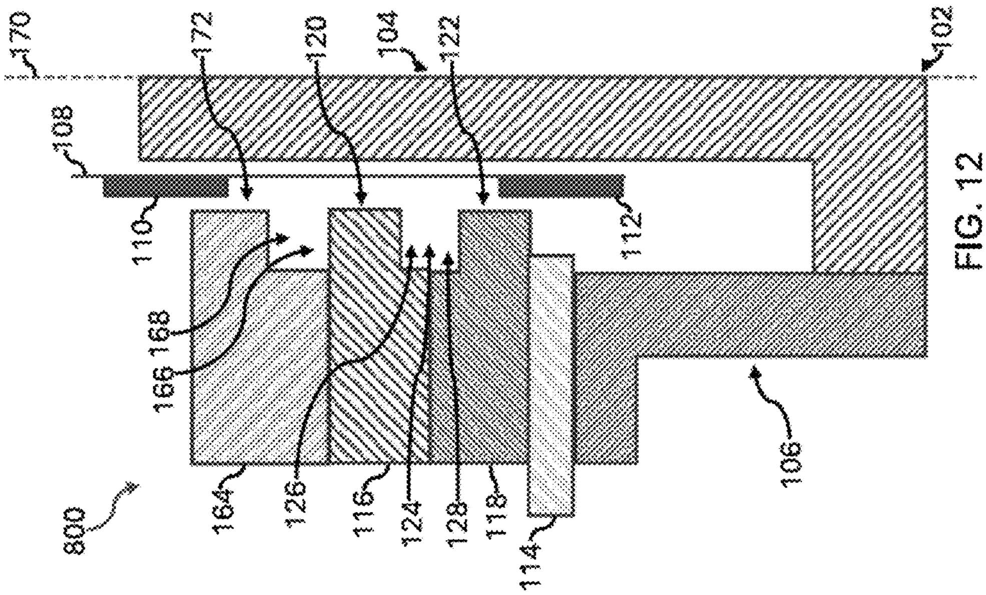
FIG. 12 illustrates half of a sectioned view of a transducer assembly with the components of the transducer assembly of FIG. 1A but with a third plate.

FIG. 12 illustrates a transducer assembly 800 that can include at least any of the features of the transducer assembly 100 as well as the other transducer assemblies disclosed herein. The transducer assembly 800 can include a third plate 164, which can at least include any of the features of the first plate 116 and/or second plate 118. The third plate 164 can be disposed on (e.g., bonded to) the first plate 116, which can include being disposed on a distal-facing surface of the first plate 116. The first plate 116 can be axially between the third plate 164 and the second plate 118. The third plate 164 can form a third magnetic gap 172 radially between the pole piece 104 and the third plate 164. The third plate 164 can include a third recess 168, which can include any of the features of the first recess 126 and/or second recess 128. The third recess 168 can create a region 166 of greater reluctance axially between the first magnetic gap 120 and the third magnetic gap 172. The third recess 168 can space the third plate 164 radially away from the pole piece 104. The third recess 168 can include a size and/or shape that matches the combined size and/or shape of the first recess 126 and second recess 128. The axial length of the third recess 168 can be the same as the combined axial length of the first recess 126 and second recess 128. The axial length of the third magnetic gap 172 can be the same as the first magnetic gap 120 and/or second magnetic gap 122. The size and/or shape of the third magnetic gap 172 can be the same as the size and/or shape of the first magnetic gap 120 and/or second magnetic gap 122. The first coil portion 110 and second coil portion 112 can be axially spaced apart, which may include lengthening the former 108, such that the first coil portion 110 is disposed along about half of the axial length of the third magnetic gap 172 and the second coil portion 112 is disposed along about half of the axial length of the second magnetic gap 122 with the transducer assembly 800 at rest. The addition of the third plate 164 can, in some variants, facilitate a greater length of travel for the first coil portion 110 and second coil portion 112 through a condition of substantially constant speaker force factor (e.g., magnetic flux immersion) for highly linear magnetic force. In some variants, the transducer assembly 800 can include more than three plates, more than three magnetic gaps, more than two regions of greater reluctance, and/or more than two coil portions.

The voice coil winding bodies (e.g., voice coil portions) can be in series. In some variants, dual voice coil arrangements can be implemented. In some variants, separate alternative current drive may be provided for both voice coil portions (e.g., voice coil winding bodies).

The formers (e.g., tubular members) with voice coil portions disposed thereon can move distally and proximally along the pole pieces described herein due to an electrical current. For example, the voice coil portions can be disposed within magnetic gaps (e.g., within a magnet's magnetic field). An electrical signal, such as an audio signal, can flow through the voice coil portions to provide varying magnetic fields around the voice coil portions from the interaction between the electrical signal (e.g., current) and the magnetic fields. The interactions between the magnetic fields of the voice coil portions and the permanent magnets' fields can cause the voice coil portions and former upon which the voice coil portions are disposed to move. The direction of current can change the direction of the movement (e.g., distal movement and proximal movement). A diaphragm, such as a cone, can be attached to the former and/or at least one of the voice coil portions (e.g., distal voice coil portion). As the former and voice coil portions move, the diaphragm can move as well to create pressure waves in the air, which an ear and/or microphone can perceive as sound. The frequency and/or amplitude of the electrical signal can determine the pitch and/or volume of the sound produced.

The stroke (e.g., excursion) of a transducer assembly can refer to the distal and proximal movement, which can include the full distal and proximal movement, of the voice coil portions and former. For example, one stroke of the transducer assembly can refer to the movement of the former and voice coil portions from a rest position, to the distal-most position, to the proximal-most position, and back to the rest position. As described herein, the speaker force factor of the transducer assembly can be substantially consistent throughout a stroke. For example, the speaker force factor may remain within less than 10% of, within less than 5% of, within less than 1% of, within less than 0.1% of, and within less than 0.01% of the speaker force factor of the transducer assembly at rest through the stroke. In some variants, the speaker force factor of the transducer assembly can be substantially consistent throughout a majority of a stroke. For example, the speaker force factor may remain within less than 10% of, within less than 5% of, within less than 1% of, within less than 0.1% of, and within less than 0.01% of the speaker force factor of the transducer assembly at rest through a majority of a stroke. The majority of a stroke can include 50% or more of the travel of the former and voice coil portions during the stroke. As described in reference to FIG. 1A-2D, the speaker force factor of the transducer assembly, in some variants, can decrease below the speaker force factor with the transducer assembly at rest as a proximal-most voice coil portion moves distally outside of a distal-most magnetic gap or a distal-most voice coil portion moves proximally outside of a proximal-most magnetic gap, which can occur at the ends of distal and proximal travel of the former and voice coil portions. The need to control force factor over a range of stroke is in order to control total harmonic and intermodulation distortion (e.g. THD, IMD) of the transducer to be within an acceptable threshold while operating.

It is intended that the scope of this present invention herein disclosed should not be limited by the particular disclosed embodiments described above. For example, the transducer assemblies are described, in some instances, within the context of an interior trim of a vehicle; however, the transducer assemblies described herein can be utilized in other contexts. This invention is susceptible to various modifications and alternative forms, and specific examples have been shown in the drawings and are herein described in detail. This invention is not limited to the detailed forms or methods disclosed, but rather covers all equivalents, modifications, and alternatives falling within the scope and spirit of the various embodiments described and the appended claims. Various features of the transducer assemblies described herein can be combined to form further embodiments, which are part of this disclosure.

Methods of using the transducer assemblies and/or loudspeakers (including device(s), apparatus(es), assembly(ies), structure(s) or the like) are included herein; the methods of use can include using or assembling any one or more of the features disclosed herein to achieve functions and/or features of the system(s) as discussed in this disclosure. Methods of manufacturing the foregoing system(s) are included; the methods of manufacture can include providing, making, connecting, assembling, and/or installing any one or more of the features of the system(s) disclosed herein to achieve functions and/or features of the system(s) as discussed in this disclosure.

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or subcombinations of the specific features and variants of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and variants of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The ranges disclosed herein also encompass any and all overlap, sub-ranges, and combinations thereof. Language such as "up to," "at least," "greater than," "less than," "between," and the like includes the number recited. Quantitative descriptors (e.g., lengths, widths, amounts, distances, proportions, percentages, fractions, relationship, etc.) preceded by a term such as "approximately", "about", "substantially", and the like as used herein include the recited descriptor and also represent a quantity close to the stated quantitative descriptor that still performs a desired function or achieves a desired result. For example, "approximately", "about", and "substantially" can refer to quantities that are within less than 10% of, within less than 5% of, within less than 1% of, within less than 0.1% of, and within less than 0.01% of the stated quantity. For instance, the description refers to a coil portion occupying about half of an axial gap length, which can refer to amounts that are within less than 10% of, within less than 5% of, within less than 1% of, within less than 0.1% of, and within less than 0.01% of half. In another example, the foregoing description refers to two lengths being approximately equivalent, which can refer to the two lengths being within less than 10% of, within less than 5% of, within less than 1% of, within less than 0.1% of, and within less than 0.01% of equivalent.

What is claimed is:

1. A transducer assembly comprising:

a pole piece;

a former disposed about the pole piece;

a first coil portion and a second coil portion disposed on the former and axially spaced apart from each other, wherein the first coil portion and the second coil portion are configured to direct current in a same direction with respect to a cross-section; and a magnetic structure disposed around the pole piece, the magnetic structure comprising a magnet, a first plate, and a second plate, wherein the first plate provides a first magnetic gap having an axial gap length, the second plate provides a second magnetic gap having the same axial gap length, and the first plate and the second plate cooperate to provide a region of greater magnetic reluctance between the first magnetic gap and the second magnetic gap compared to magnetic reluctances at the first magnetic gap and the second magnetic gap;

wherein each of the first coil portion and the second coil portion comprise an axial coil length that is approximately equivalent to a combined axial length of the region of greater magnetic reluctance and the axial gap length of the first magnetic gap or the second magnetic gap;

wherein the first coil portion is configured to occupy about half of the axial gap length of the first magnetic gap, and the second coil portion is configured to occupy about half of the axial gap length of the second magnetic gap with the transducer assembly at rest; and wherein the transducer assembly is configured to provide a substantially consistent speaker force factor through a majority of a stroke.

2. The transducer assembly of claim 1, wherein the second plate is disposed between the first plate and the magnet in an axial direction.

3. The transducer assembly of claim 1, wherein a radial distance between the pole piece and the first plate and the second plate at the first magnetic gap and the second magnetic gap is smaller than at the region of greater magnetic reluctance.

4. The transducer assembly of claim 1, wherein at least one of the first plate and the second plate comprises a recess in a radial direction at the region of greater magnetic reluctance.

5. The transducer assembly of claim 4, wherein the recess is a notch.

6. The transducer assembly of claim 1, wherein the first coil portion and the second coil portion are wound in a same coil direction about a mandrel.

7. The transducer assembly of claim 1, wherein the first magnetic gap is radially disposed between the pole piece and a portion of the first plate closest to the pole piece.

8. The transducer assembly of claim 7, wherein the second magnetic gap is radially disposed between the pole piece and a portion of the second plate closest to the pole piece.

9. A transducer assembly comprising:

a pole piece;

a former disposed about the pole piece;

a first coil portion and a second coil portion disposed on the former and axially spaced apart from each other, wherein the first coil portion and the second coil portion are wound in a same direction with respect to a cross-section; and a magnetic structure disposed around the pole piece, the magnetic structure comprising a magnet, a first plate that provides a first magnetic gap having a first axial gap length, a second plate that provides a second magnetic gap having a second axial gap length, and a region of greater magnetic reluctance compared to magnetic reluctances at the first magnetic gap and the second magnetic gap, the region of greater magnetic reluctance disposed between the first magnetic gap and the second magnetic gap;

wherein, with the transducer assembly at rest, the first coil portion is configured to occupy about half of the first axial gap length of the first magnetic gap and the second coil portion is configured to occupy about half of the second axial gap length of the second magnetic gap.

10. The transducer assembly of claim 9, wherein a portion of the first plate is disposed radially outward of the second plate.

11. The transducer assembly of claim 9, wherein a radial distance between the pole piece and the first plate at the first magnetic gap is smaller than at the region of greater magnetic reluctance.

12. The transducer assembly of claim 9, wherein the first plate comprises a recess in a radial direction at the region of greater magnetic reluctance.

13. The transducer assembly of claim 9, wherein the first magnetic gap is radially disposed between the pole piece and a portion of the first plate closest to the pole piece.

14. The transducer assembly of claim 13, wherein the second magnetic gap is radially disposed between the pole piece and a portion of the second plate closest to the pole piece.

15. A transducer assembly comprising:

a central ferromagnetic component;

a tubular member having a closed shape disposed about the central ferromagnetic component;

a first conductive coil portion and a second conductive coil portion disposed on the tubular member and axially spaced apart from each other, wherein the first conductive coil portion and the second conductive coil portion are wound in a same direction; and a magnetic structure disposed around the central ferromagnetic component, the magnetic structure comprising a magnet, a first ferromagnetic element that provides a first magnetic gap having a first axial gap length, a second ferromagnetic element that provides a second magnetic gap having a second axial gap length, and a region of greater magnetic reluctance compared to magnetic reluctances at the first magnetic gap and the second magnetic gap, the region of greater magnetic reluctance disposed between the first magnetic gap and the second magnetic gap.

16. The transducer assembly of claim 15, wherein a radial distance between the central ferromagnetic component and the first ferromagnetic element at the first magnetic gap is smaller than at the region of greater magnetic reluctance.

17. The transducer assembly of claim 15, wherein the first ferromagnetic element comprises a recess in a radial direction at the region of greater magnetic reluctance.

18. The transducer assembly of claim 15, wherein the first conductive coil portion comprises an axial coil length that is about a combined axial length of the first axial gap length and the region of greater magnetic reluctance.

19. The transducer assembly of claim 15, wherein the first magnetic gap is radially disposed between the central ferromagnetic component and a portion of the first ferromagnetic element closest to the central ferromagnetic component, and wherein the second magnetic gap is radially disposed between the central ferromagnetic component and a portion of the second ferromagnetic element closest to the central ferromagnetic component.

20. The transducer assembly of claim 15, wherein the tubular member is free to move over a distance in response to an electrical signal applied to the first conductive coil portion and the second conductive coil portion.

* * * * *